United States Patent [19]

Ueberegger

[11] Patent Number: 4,834,822
[45] Date of Patent: May 30, 1989

[54] METHOD FOR JOINING OVERLAPPING EDGES OF A MULTI-LAYER FOIL, AND A TUBULAR LINER PRODUCED ACCORDING TO THE METHOD

[75] Inventor: Henry Ueberegger, Adetswil, Switzerland

[73] Assignee: KMK Karl Magerle Lizenz AG, Zug, Switzerland

[21] Appl. No.: 108,142

[22] Filed: Oct. 14, 1987

[30] Foreign Application Priority Data

Oct. 15, 1986 [CH] Switzerland ............... 04118/86

[51] Int. Cl.⁴ ................. B29C 53/54; B32B 31/20
[52] U.S. Cl. ........................ 156/203; 156/218;
156/258; 156/272.4; 156/309.6; 156/380.1;
156/466; 428/60; 493/292; 493/302
[58] Field of Search ............ 156/159, 258, 304.5,
156/502, 218, 203, 272.4, 309.6, 379.8, 380.1,
466; 428/57, 60; 493/269, 392, 302; 220/450,
75, DIG. 29

[56] References Cited

U.S. PATENT DOCUMENTS 3,486,964 12/1969 Bruncid .................. 156/203
4,469,542 9/1984 Reil ........................ 156/203

FOREIGN PATENT DOCUMENTS 54-155284 12/1979 Japan .................. 156/218
55-034909 3/1980 Japan .................. 156/218
56-151650 11/1981 Japan .................. 156/218
58-187342 11/1983 Japan .................. 156/218

Primary Examiner—Michael Wityshyn
Attorney, Agent, or Firm—Cushman, Darby & Cushman

[57] ABSTRACT

Of two edges (14, 16) to be joined together of a multi-layer foil, the inner edge (16) is obliquely trimmed in the longitudinal direction prior to the pressing together in such a way that the layer (6) located remote from the surfaces (10, 12) to be pressed together protrudes beyond the other layers. If the two layers (14, 16) are pressed together during the welding operation by means of two tool elements, not shown, then the inner layer (6) of the inner edge (16) overflows so as to form one uninterrupted layer with the inner layer (6) of the outer edge (14). When the foil is used as packaging material, in particular as a tubular liner for a packaging tube, it is assured that the product to be packaged will come into contact only with the inner layer (6), so that an undesirable reaction with one of the other layers is avoided.

5 Claims, 2 Drawing Sheets

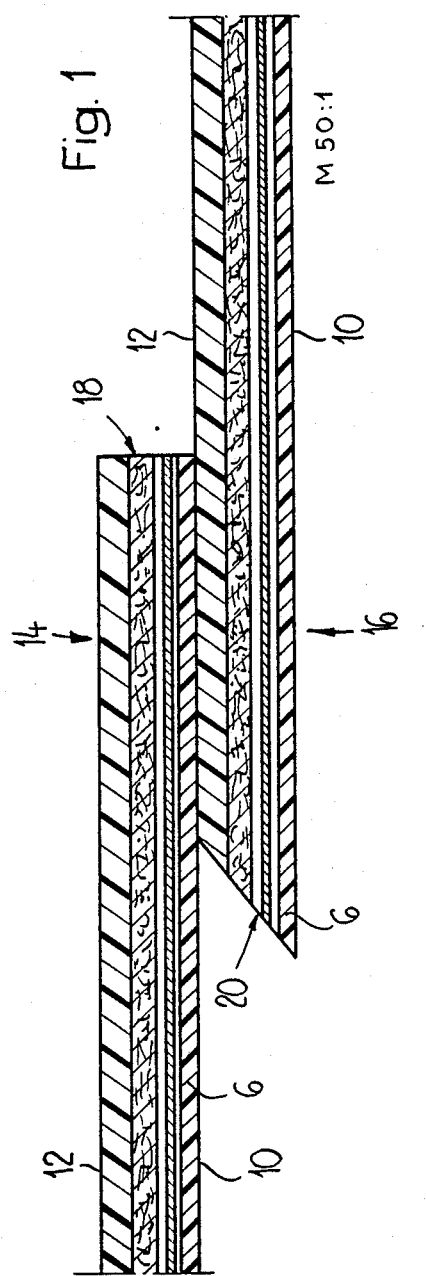
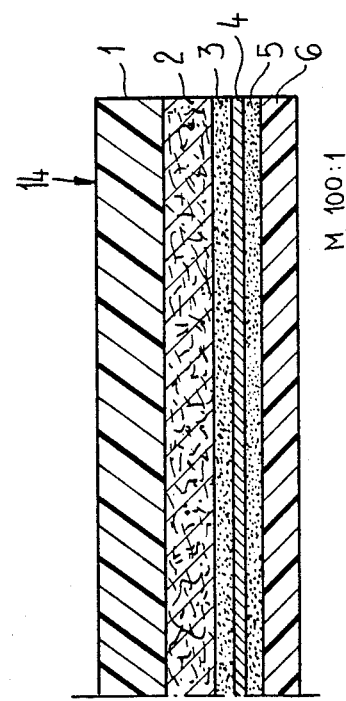

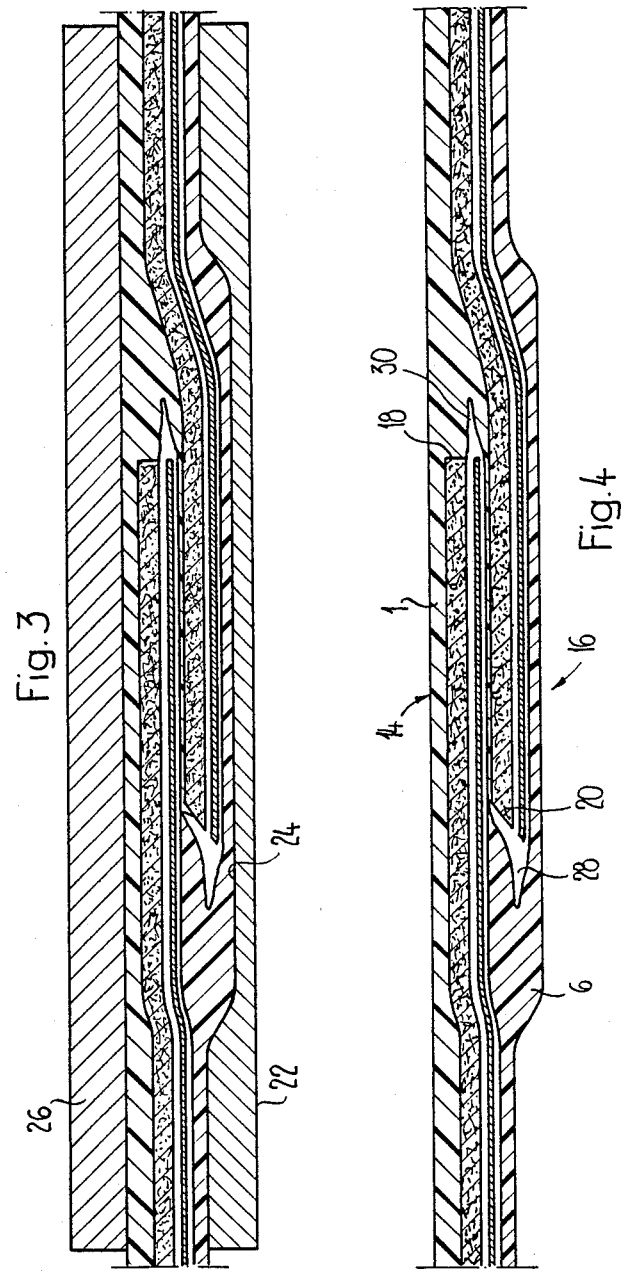

METHOD FOR JOINING OVERLAPPING EDGES OF A MULTI-LAYER FOIL, AND A TUBULAR LINER PRODUCED ACCORDING TO THE METHOD

FIELD OF THE INVENTION

The invention relates to a method for joining overlapping edges of a multi-layer foil having an inside and an outside and at least on the inside having a layer of a weldable plastic. The inside of one edge is pressed against the outside of the other edge and the two edges are welded together by the action of heat. The invention also relates to a tubular body produced by this method.

BACKGROUND OF THE INVENTION

The layers of a multi-layer foil have different tasks, for example if the foil is used as packaging material. The layer facing the product to be packaged must be chemically neutral to this product. At least one intermediate layer serves to provide the desired strength and the desired elasticity, especially when the foil is used for a packaging container. The outside layer must be able to carry print and should have a surface that is visually and physically attractive. In the case of a diffusible product it may also be necessary to reinitialize one of the intermediate layers as a diffusion-inhibiting barrier. For example, if one of the intermediate layers is of metal, then typically an adhesive layer on both sides of the metal is required to assure a reliable bond with the other layers. At least one of the outer layers is of a weldable or sealable plastic, so that the package to be produced can be sealed shut.

A tubular body intended for packaging tubes typically has a longitudinal seam, at which the overlapping edges of the multilayer foil are sealed together.

The inside surface adjacent one edge is typically sealed to the outside surface adjacent the other edge. Such a seam does form a tight closure, but it has the disadvantage that the inner layer, facing the product, is interrupted along the seam because of the multi-layer structure of the foil. This presents the risk that the packaged product may come into contact, in the vicinity of the seam, not only with the chemically neutral layer but with the other layers as well.

SUMMARY OF THE INVENTION

It is accordingly the object of the invention to provide an improved method of the above type so that contact of the packaged product with the other layers of the foil is prevented. This object is attained according to the invention as described below. With the method according to the invention, the inner layer of the inner edge, facing the product to be packaged, protrudes beyond the other layers of this edge, so that the inner layer covers the interface with the other layers and can be joined to the inner layer of the outer edge by means of the welding operation. This assures that the seam on the side facing the product is completely covered by the inner layer. Especially when a high degree of cleanliness is required, the method according to the invention effectively prevents the product from coming into an undesirable or even impermissible contact with any of the intermediate layers, so that the bonds produced according to the method of the invention are also suitable for packaging products for which previously a special container lining, or double packages, were necessary.

In a preferred feature of the invention, the joining of the multi-layer foil is effected through both the overlapping surfaces of the two edges and the continuous inner layer. This kind of bond is not only tightly sealed but is also particularly sturdy mechanically.

In another preferred feature of the invention, the periphery of the other edge is cut off obliquely before the edges are pressed together. However, it is also possible for the foil to be initially produced with the edges of the individual layers stepped or recessed, so that the innermost layer, at least protrudes beyond the other layers.

The invention also provides a preferred dimension for the angle at which the edge is cut.

In another feature of the invention, the welding heat is generated in the metal layer embedded inside the foil, enabling a purposefully controlled, quick heating of the layers to be welded together. This also makes it possible to avoid undesirable heating of other locations, so that the ensuing cooling operation for increasing production output can be shortened.

In another feature of the invention, the welding connection takes place in a longitudinal groove of one of the tools, which may for example be a revolving steel belt. This steel belt serving as a tool may also be preheated, to accelerate the welding operation and in particular to assure that the inner layers of both edges will flow into one another.

The invention also relates to the production of a tubular liner for a packaging tube, the seam of which is produced according to the above method. With the invention, packaging tubes can be made of various kinds of laminate even for products that behave aggressively in the presence of metals, such as aluminum. The method according to the invention entails virtually no additional cost for the production of a tubular body for a packaging tube as compared with conventional methods.

Preferred materials for making the tubular body are also disclosed.

BRIEF DESCRITPION OF THE DRAWINGS

FIG. 1 shows the overlapping edges of a multi-layer foil in cross section through a seam to be produced, shown prior to the welding;

FIG. 2 shows the structure of the multi-layer foil;

FIG. 3 is a cross-sectional view of the seam to be produced between two belts serving as tools; and FIG. 4 shows the finished seam in cross section.

DESCRIPTION OF THE PREFERRED EMBODIMENT

FIG. 1 shows two overlapping edges of a multi-layer foil, for example for a tubular seam to be produced for a packaging tube. Both foil edges have an inside 10 and outside 12. The inside 10 is oriented toward the product to be packaged. In the arrangement shown, the inside 10 of one edge 14 rests on the outside 12 of the other edge 16. The cut edge 18 of the outer edge 14 is cut straight across. The cut edge 20 of the inner edge is cut obliquely, such that the layer 6 located remote from the surfaces 10, 12 to be pressed together protrudes beyond the other layers of this edge. The cut edge 20 has a preferred angle of 40°, with respect to the transverse direction. FIG. 1 is on a scale of 50:1.

FIG. 2 shows the outer edge 14 on a scale of 100:1, to facilitate describing the individual layers. The outer layer 1 comprises a thermoplastic plastic, for example polyethylene, polypropylene or the copolymers of these materials. The second layer 2 consists of paper, to lend the foil the desired stiffness or rigidity. The third layer 3 is a plastic adhesive layer, to provide reliable bonding to the fourth layer 4, which is of aluminum. The aluminum layer 4 serves in particular to attain the described elasticity and may optionally also serve as a diffusion barrier. Located on the outer side of the aluminum layer 4 is another plastic adhesive layer 5, to provide reliable bonding between the aluminum layer 4 and the inner layer 6. The inner layer 6 is again of a thermoplastic plastic, which like the outer layer 1 is weldable. The inner layer can be different from the outer layer 1 in terms of its properties, however. For example, the inner layer 6 may be transparent, while the outer layer 1, which is to be printed, is preferably colored.

FIG. 3 shows the overlapping layers of FIG. 1 between two belts 22 and 26 serving as tools. The inner belt 22 is a steel belt having a longitudinal groove 24, into which the overlapping edges 14 and 16 are pressed by the opposed belt 26 during the welding operation. The belts 22 and 26 are driven to revolve by means not shown, so that the joining of the two foil edges 14 and 16 is performed endlessly and continuously.

The welding heat is generated in the two overlapping aluminum layers 4 (see FIG. 2) by means of high frequency. for reinforcing this process, the inner belt 22 is additionally preheated. The directly heated aluminum layers 4 of both edges give off heat to the adjoining plastic layers, in particular to the two adhesive layers 3 and 5 and furthermore to the thermoplastic plastic layer 6 as well, which forms the inner layer and is to be welded to the inner layer of the facing edge. Comparatively little heat is transmitted by the heated aluminum layer 4 to the outer plastic layer 1, because the intervening paper layer 2 acts as insulation. Because of the more intensive heating of the inner plastic layers 6 of both edges 14 and 16, an intimately welded connection is produced, and because of the oblique cut edge 120, the plastic layer 6 of the inner edge 16 is is caused to overflow. With the oblique cut edge 20, an increased amount of material of the plastic layer 6 is also made available for processing. By means of the pressing force between the two belts 22 and 26 into the groove 24, a practically seamless transition results between the plastic layers 6 of the two edges 14 and 16.

In FIG. 4, the finished connection is shown in cross section. As the drawing shows, the thermoplastic plastic layer 1 of the inner edge 16, in the vicinity of the oblique cut edge 20 and connected with it the two adhesive layers 3 and 5 (see FIG. 2) as well, have been squeezed out into a tag-like portion 28. Although this tag-like portion 28 does protrude into the inner plastic laye 6, it does not represent any interruption of the plastic layer 6 that has flowed together from the two edges 14 and 16.

The outer plastic layer 1 of both edges 14 and 16 has also flowed together to form a continuous layer, in particular because of the pressure exerted upon the layer 1 of the outer edge 14 by the outer belt 16, which is also preferably a steel belt. At the cut edge 18 of the outer edge 14, a tag-like portion 30 of the adhesive layers 3 and 5 (see FIG. 2) has been squeezed out, and has forced its way into the layer 1 but without interrupting this layer.

What is claimed is:

1. In a method for the continuous forming of a seal between an outer edge and an overlapping inner edge of a multi-layer foil to form a tubular body, the outer edge and the inner edge each having an inside layer of weldable plastic and an outside layer of weldable plastic and peripheries cut in a longitudinal direction of the tubular body, the periphery of the inner edge being cut at an angle so that the inside layer of said inner edge protrudes beyond the other layers of said inner edge, including the steps of sealing together the outer edge and the inner edge and the inside layer of the inner edge and the inside layer of the outer edge by application of heat and pressure, the improvement comprising:
   (a) pressing the outer edge and inner edge between two tools, one of which has a groove to be disposed against the inner edge for receiving the overlapping inner edge and outer edge;
   (b) heating the inside layer more intensively than the other layers of the inner edge and the outer edge to cause the inside layer of said inner edge to overflow in said groove to form an intimately welded inside layer with the inside layer of the outer edge;
   (c) squeezing the outside layer of the outer edge into the outside layer of the inner edge; and
   (d) flowing together the outside layer of the inner and outer edges to form a continuous layer.

2. The method of claim 1, wherein said angle is approximately 40°.

3. The method as claimed in claim 1, including the step of using a foil having a metal layer and at least one plastic adhesive layer joining the metal layer to the weldable plastic inside layer and wherein the application of heat is effected by generating heat inductively in the metal layer whereby the heat is transmitted from the thus heated metal layer to the other layers.

4. The method as claimed in claim 1, including the step of preheating said one tool.

5. The method as claimed in claim 1, including the step of using a foil having a metal layer and at least one plastic adhesive layer joining the metal layer to the weldable plastic inside layer and to a layer of insulating material.

* * * * *